(12) United States Patent
Gale et al.

(10) Patent No.: US 8,312,077 B2
(45) Date of Patent: Nov. 13, 2012

(54) CLIENT APPARATUS FOR UPDATING DATA

(75) Inventors: Martin J. Gale, Eastleigh (GB); Bharat Veer Bedi, Portsmouth (GB)

(73) Assignee: International Business Machines Corporation, Armonk, NY (US)

( * ) Notice: Subject to any disclaimer, the term of this patent is extended or adjusted under 35 U.S.C. 154(b) by 618 days.

(21) Appl. No.: 11/940,455

(22) Filed: Nov. 15, 2007

(65) Prior Publication Data
US 2008/0120368 A1 May 22, 2008

(30) Foreign Application Priority Data
Nov. 18, 2006 (GB) .................................. 0623068.4

(51) Int. Cl.
*G06F 15/16* (2006.01)

(52) U.S. Cl. .................... 709/203; 709/202; 709/206

(58) Field of Classification Search .................. 709/203; 715/229; 1/1
See application file for complete search history.

(56) References Cited

U.S. PATENT DOCUMENTS

| 6,377,957 | B1 | | 4/2002 | Jeyaraman | |
|---|---|---|---|---|---|
| 6,526,410 | B1 | * | 2/2003 | Aoyama et al. | 1/1 |
| 6,560,620 | B1 | * | 5/2003 | Ching | 715/229 |
| 6,701,327 | B1 | | 3/2004 | Jones et al. | |
| 6,944,623 | B2 | * | 9/2005 | Kim | 1/1 |
| 7,281,018 | B1 | * | 10/2007 | Begun et al. | 1/1 |
| 7,353,225 | B2 | * | 4/2008 | Dada | 1/1 |
| 2005/0080757 | A1 | * | 4/2005 | Sharma et al. | 707/1 |
| 2006/0047620 | A1 | * | 3/2006 | Branson et al. | 707/1 |

FOREIGN PATENT DOCUMENTS
WO     2004045189 A2    5/2004

* cited by examiner

*Primary Examiner* — Firmin Backer
*Assistant Examiner* — Keyvan Emdadi
(74) *Attorney, Agent, or Firm* — Steven L. Nichols; VanCott, Bagley, Cornwell & McCarthy P.C.

(57) ABSTRACT

A client apparatus receives first data from a server and later receives second data from the same server in response to a refresh invocation. The client apparatus parses the received data to generate logical structures representing the data and then compares the logical structures using a tree walking algorithm. Where a difference is found between the first data and second data, the first data is updated using the second data and rendered at the client apparatus.

23 Claims, 5 Drawing Sheets

```
<html>
    <head>
        <title>News</title>
        <meta>http-equiv="refresh" contents'"150"</meta>
    </head>
    <body>
        <div id="news_1">
            <a href="http//www.newsitem1.html">Company X is due to be sold</a>
        </div>
        <div id+"news_2"-correct?>
            <a href="http//www.newsitem2.html">John Smith has transferred to
            Football Team ABC</a>
        </div>
    </body>
</html>
```

FIG. 4

CLIENT APPARATUS FOR UPDATING DATA

BACKGROUND OF THE INVENTION

The present invention relates to a client apparatus for updating data.

The World Wide Web is the Internet's multimedia information retrieval system. In the web environment, a client machine communicates with a web server using the Hypertext Transfer Protocol (HTTP).

With reference to FIG. 1, there is shown a system (100) in which a web browser (110), an application running on a client computer (105), renders a web page (115) by requesting the web page from a web server (120). Such a web page is constructed using a markup language such as Hypertext Markup Language (HTML), Extensible Hypertext Markup Language (XHTML) etc.

In the prior art, the web browser can be automatically invoked to initiate a refresh of the complete content of a web page periodically (e.g. every 2 minutes). In some cases, this may be acceptable to a user.

However, in other cases this is not desirable. For example, a web page may include share prices that are refreshed periodically and a form that a user can fill in. If a user has partially completed the form on the webpage when the complete web page refreshes, the user may lose data that they have already entered into the form. This can obviously be frustrating to a user. Furthermore, a full web page refresh can be very slow and cause the screen to flicker.

U.S. Pat. No. 6,377,957 discloses a system that propagates changes in hierarchically organized data to remotely cached copies of the data. The system operates by receiving an access to the data at a client. In response to this access, the system determines if the client contains a copy of the data. If so, the system sends a request to a server for an update to the copy. The server receives the request and determines differences between the current version of the data at the server and an older copy of the data at the client, which the server has stored locally. These differences are used to construct an update for the copy of the data, which may include node insertion and node deletion operations for hierarchically organized nodes in the data. Next, the update is sent to the client where it is applied to the copy of the data to produce an updated copy of the data. Finally, the original access is allowed to proceed on the updated copy of the data.

BRIEF SUMMARY OF THE INVENTION

The invention may be embodied as a client apparatus for updating data for use with a system comprising a receiver for receiving first data and a refresh invocation means for invoking a refresh of the first data. The receiver receives second data in response to the refresh invocation means. The second data may be identical to or different from the first data. The apparatus includes a comparator for comparing the first data and the second data to determine whether there is a difference and an updater that responds to the determination of a difference by updating the first data with the second data.

The invention may also be embodied as a method for updating data for use with a system for receiving first data, invoking a refresh of the first data, and receiving second data. At a client computer, the first and second data are compared. If there is a difference, the first data is updated with the second data.

The invention may also be implemented as a computer program product for updating data in a client computer system in which first data is received and then refreshed with second data. The computer program product includes a computer usable medium embodying computer usable program code configured to compare the first data and the second data and to determine whether there is a difference between the first data and the second data. If a difference is found, other computer usable program code in a computer program product updates the first data with the second data.

BRIEF DESCRIPTION OF THE SEVERAL VIEWS OF THE DRAWINGS

FIG. 4 is a representation of a first XHTML document.

DETAILED DESCRIPTION OF THE INVENTION

Figure 1:
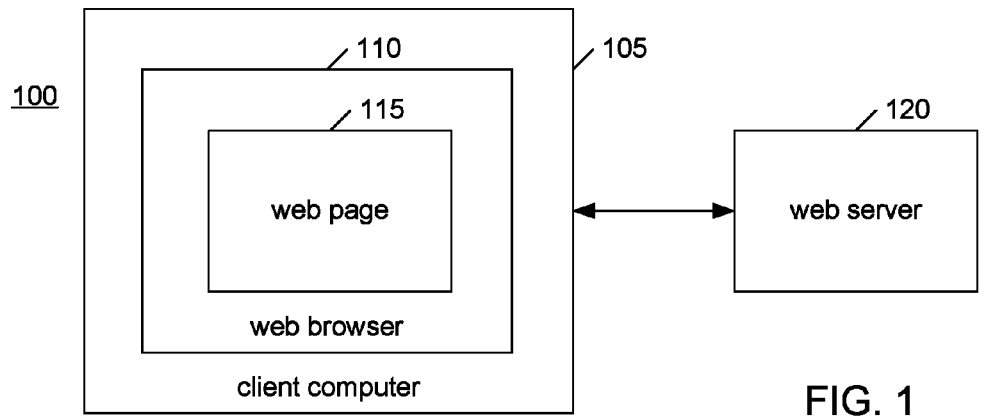
FIG. 1 is a block diagram of a system comprising a client computer and a server computer.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 2:
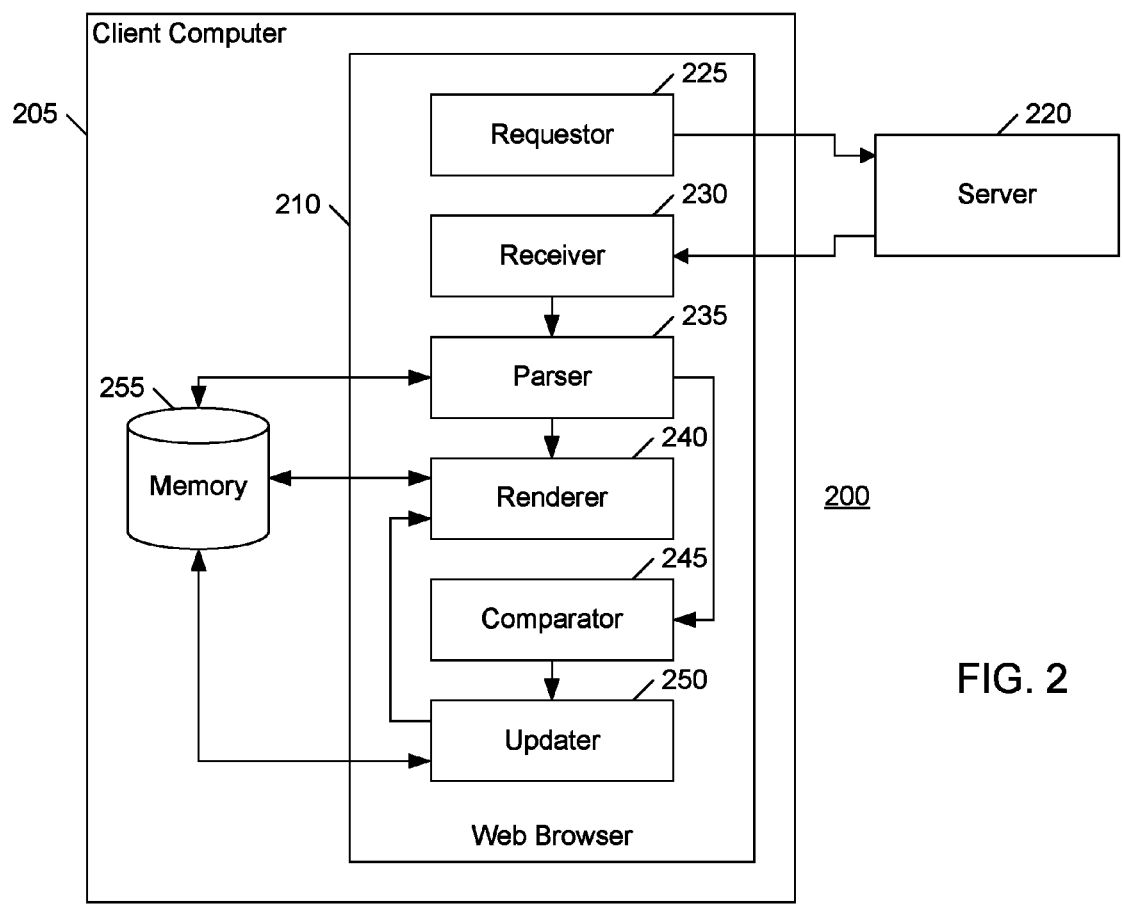
FIG. 2 is a block diagram of a system in which the present invention may be implemented.

With reference to FIG. 2, there is shown a block diagram of a system (200) in which the present invention can be implemented. The system (200) includes a client computer and a server computer (220) each operable to communicate with the other over a network such as the Internet. The client computer (205) includes a web browser (210) for rendering a web page served by the server computer (220).

The client computer (205) also comprises a requester (225) for sending a request for a web page to the server computer (220); a receiver (230) for receiving a response from the server computer (220); a parser for parsing a document included in a response and storing an associated Document Object Model (DOM) in memory (255) and a renderer (240) for rendering the document. Document Object Models (DOMs) are described in more detail later.

The client computer (205) also includes a comparator (245) for comparing a plurality of DOMs and an updater (250) for updating a DOM. It should be understood that the apparatus of the present invention can reside within a web browser at the client computer.

An example of a preferred embodiment will now be described with reference to the drawings.

Figure 3A:
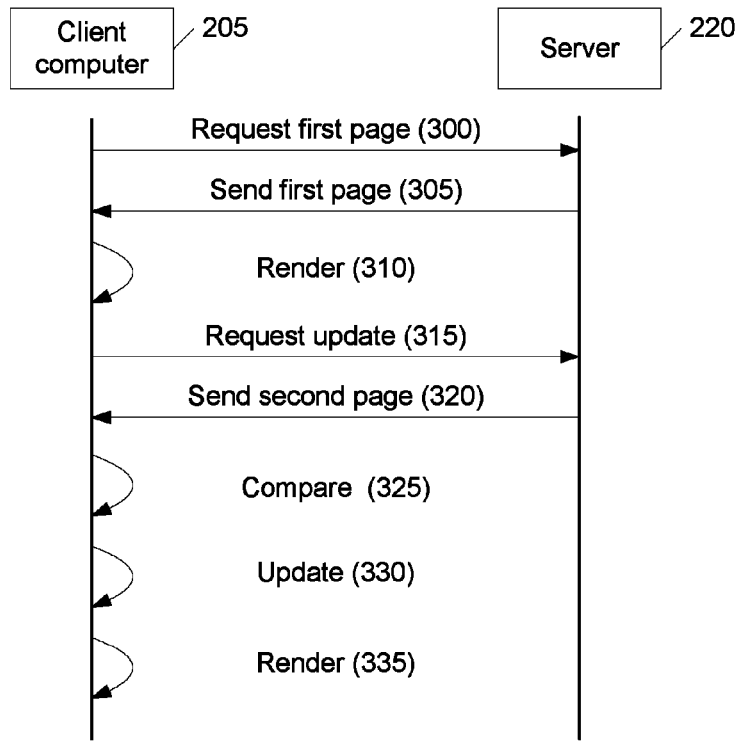
FIG. 3A is a chart showing the operational steps involved in a first process according to the preferred embodiment.

With reference to FIG. 3A, the requester (225) generates and sends (step 300) a request to the server computer (220) for a first web page. In the example, the request is represented by an XMLHTTPRequest object. By using the XMLHTTPRequest object, a web page can be changed with data from the server computer (220) after the web page has loaded. Various methods can be used with the XMLHTTPRequest object. In the example described herein, the requester (225) uses an open( ) method to specify parameters of a request e.g. a "method" parameter having an associated value of "GET" which is associated with getting data and a URL parameter associated with the URL to be obtained (e.g. www.my news-.com). The requester (225) uses a send( ) method to send the request. It should be understood that the request can be implemented in a number of ways.

In response to receiving the request, the server computer (220) sends (step 305) a response including the first web page to the receiver (230). In the example, a first XHTML document associated with the first web page is included in an HTTP response sent by the server computer (220). It should be understood that any number of markup languages can be used e.g. HTML.

An example of the first XHTML document is shown in FIG. 4. The document includes elements represented by tags. Tags are enclosed by the characters "< >".

The <html></html> tags (i.e., a root element) define an XHTML document comprising a head (defined by the <head></head> tags) and a body (defined by the <body></body> tags). The head comprises <title></title> tags which enclose a text string specifying a title (i.e. "News"). The head also comprises <meta></meta> tags that are used to identify properties of a document. The <meta></meta> tags comprise an "http-equiv" attribute used to specify information that a server computer should convey in a HTTP response message with which the document is transmitted. In FIG. 4, a value of the "http-equiv" attribute is "refresh" and a value of an associated "content" attribute is "150". The example syntax specifies that the first XHTML document which includes the <meta></meta> tags should be refreshed following a period of 150 seconds. It should be understood that refresh invocation functionality can be implemented in a number of ways (e.g., program code associated with the web browser (210)).

FIG. 4 shows two <div></div> tags. Each set of <div></div> tags defines a section in the document. Each set of <div></div> tags has an associated identifier (i.e. "news_1" and "news_2"). Within each defined section, there is shown <a></a> tags which define an anchor that can be used to create a link (wherein the "href" attribute specifies a URL of the link). Within the <a></a> tags is a text string that is used to create the link. For example, the text "Company X is due to be sold" is shown to a user as a clickable link wherein the URL of the link is "www.newsiteml.html".

In response to receiving the HTTP response, the receiver (230) passes the first XHTML document to the parser (235), which loads the first XHTML document into memory (255) and parses it in order to obtain a first associated DOM.

A Document Object Model (DOM) is an application programming interface for documents. The DOM defines a logical tree-like structure of a document and the way in which a document is accessed and manipulated. A document representing a web page can be loaded into memory and parsed. Once loaded into memory and parsed, the logical structure of the document can then be accessed. Elements, attributes and text of a document can be represented as objects (known as nodes). The World Wide Web Consortium (W3C) has published specifications that define a W3C DOM.

Figure 5:
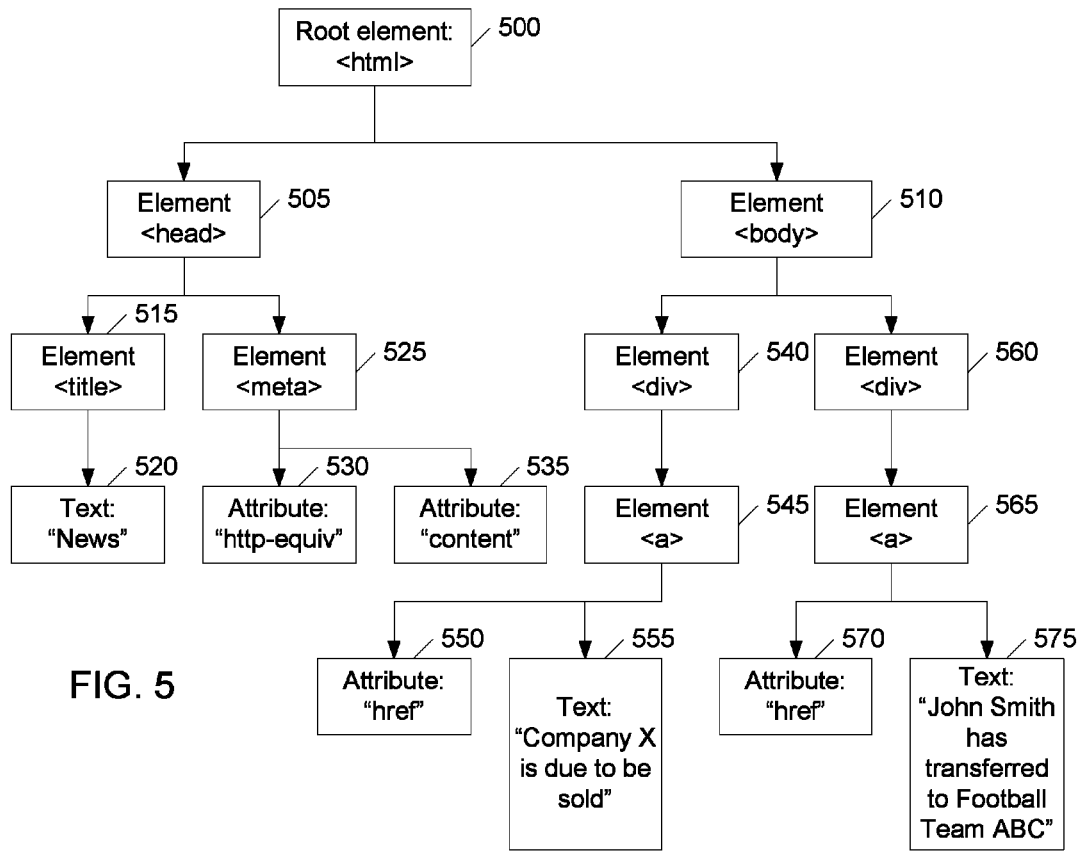
FIG. 5 is a representation of a first DOM.

A representation of the first DOM for the first XHTML document representing the first web page is shown in FIG. 5. It should be understood that any number of logical structures can be used.

The exemplary first DOM comprises a first root element node (500); a first element node (505); a second element node (515); a first text node (520); a third element node (525); a first attribute node (530); a second attribute node (535); a fourth element node (510); a fifth element node (540); a sixth element node (545); a third attribute node (550); a second text node (555); a seventh element node (560); an eighth element node (565); a fourth attribute node (570) and a third text node (575).

For exemplary purposes, the first DOM is shown having a plurality of levels.

A first level includes the first root element node (500). A second level includes the first element node (505) and the fourth element node (510). A third level includes the second element node (515), the third element node (525), the fifth element node (540) and the seventh element node (560). A fourth level includes the first text node (520), the first attribute node (530), the second attribute node (535), the sixth element node (545) and the eighth element node (565). A fifth level includes the third attribute node (550), the second text node (555), the fourth attribute node (570) and the third text node (575).

The first DOM is shown having a plurality of branches. A first (left) branch includes the second element node (515) and the first text node (520). A second (right) branch includes the third element node (525), the first attribute node (530) and the second attribute node (535). A third (left) branch includes the fifth element node (540), the sixth element node (545), the third attribute node (550) and the second text node (555). A fourth (right) branch includes the seventh element node (560), the eighth element node (565), the fourth attribute node (570) and the third text node (575).

Figure 6:
FIG. 6 is a representation of a first web page.

The renderer (240) renders (step 310) the first XHTML document. A representation of the first web page (600) is shown in FIG. 6 comprising a first section (605) and a second section (610).

As described above, the <meta></meta> tags specify that the first XHTML document should be refreshed following a period of 150 seconds. At the end of the period, the requester (220) sends (step 315) a refresh request to the server computer (220) in the form of an XMLHTTPRequest object.

In response to receiving the refresh request, the server computer (220) sends (step 320) a refresh response comprising a second web page to the receiver (230). In the example, a second XHTML document associated with the second web page is included in an HTTP response sent by the server computer (220).

Figure 7:
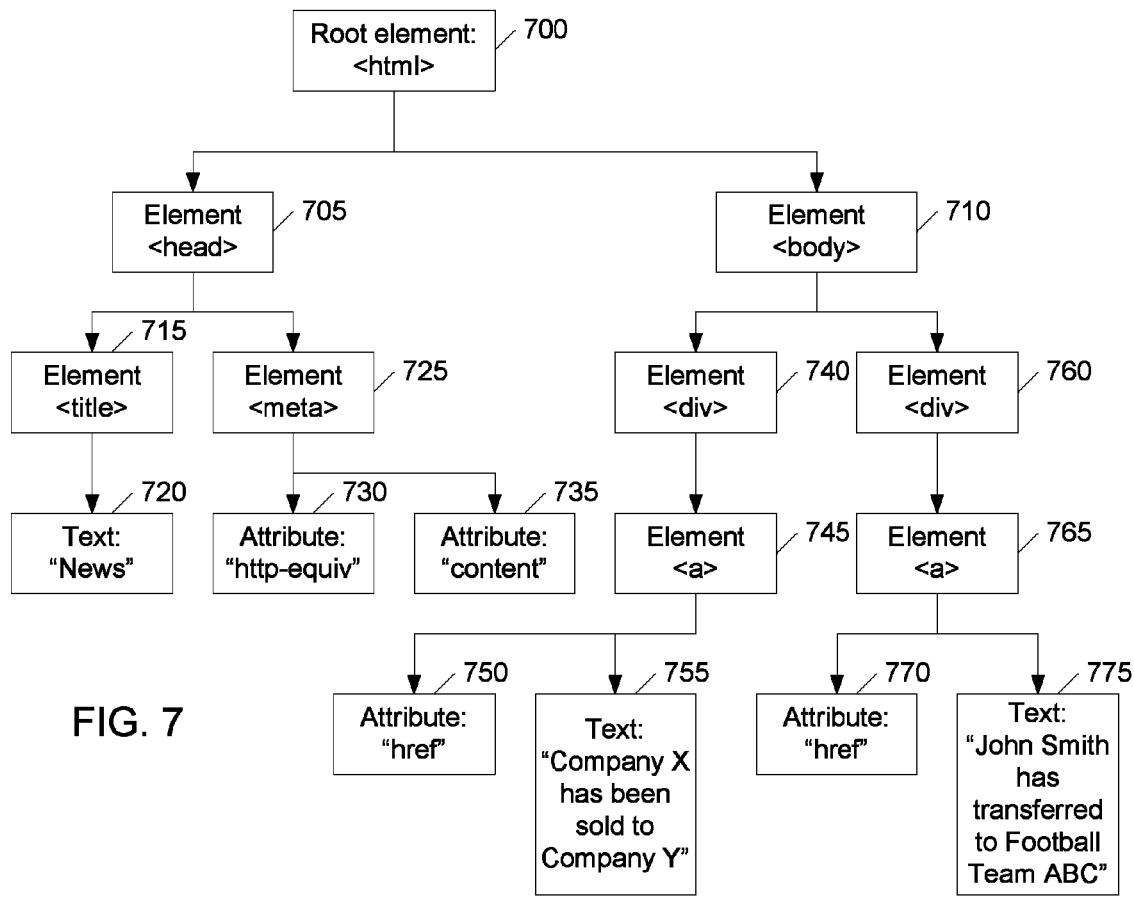
FIG. 7 is a representation of a second DOM.

In response to receiving the HTTP response, the receiver (230) passes the second XHTML document to the parser (235) which loads the second XHTML document into memory (255) and parses it in order to obtain an associated second DOM. The second DOM is shown in FIG. 7.

The second exemplary DOM comprises a second root element node (700); a ninth element node (705); a tenth element node (715); a fourth text node (720); an eleventh element node (725); a fifth attribute node (730); a sixth attribute node (735); a twelfth element node (710); a thirteenth element node (740); a fourteenth element node (745); a seventh attribute node (750); a fifth text node (755); a fifteenth element node (760); a sixteenth element node (765); an eighth attribute node (770) and a sixth text node (775).

For exemplary purposes, the second DOM is shown as a plurality of levels.

A first level includes the second root element node (700). A second level includes the ninth element node (705) and the twelfth element node (710). A third level includes the tenth element node (715), the eleventh element node (725), the thirteenth element node (740) and the fifteenth element node (760). A fourth level comprises the fourth text node (720), the fifth attribute node (730), the sixth attribute node (735), the fourteenth element node (745) and the sixteenth element node (765). A fifth level includes the seventh attribute node (750), the fifth text node (755), the eighth attribute node (770) and the sixth text node (775).

The second DOM is shown having a plurality of branches. A first (left) branch comprises the tenth element node (715) and the fourth text node (720). A second (right) branch comprises the eleventh element node (725), the fifth attribute node (730) and the sixth attribute node (735). A third (left) branch comprises the thirteenth element node (740), the fourteenth element node (745), the seventh attribute node (750) and the fifth text node (755). A fourth (right) branch includes the fifteenth element node (760), the sixteenth element node (765), the eighth attribute node (770) and the sixth text node (775).

According to the preferred embodiment, the renderer (240) does not render the second XHTML document. Rather, in response to obtaining the second DOM, the parser (235) invokes the comparator (245).

The comparator (245) executes (step 325) a comparison between the first and second DOMs. A process used by the comparator (245) will now be described with reference to FIG. 3B, wherein the comparator (245) checks for differences between the first and second DOMs.

Preferably, the comparator (245) executes a tree walking algorithm in order to compare the first and second DOMs.

Preferably, the comparator (245) uses a tree walking algorithm which visits the first level of each DOM. If no differences are found, the comparator visits one or more nodes of a left subtree of each DOM in the sequence: nodes 505 and 705, the first branch and the second branch. If no differences are found, the comparator visits one or more nodes of a right subtree of each DOM in the sequence: nodes 510 and 710, the third branch and the fourth branch. It should be understood that any number of tree walking algorithms can be implemented.

If the comparator (245) determines that a difference is found between the DOMs, the comparator (245) invokes the updater (250) as will be described later.

In the example described herein, the updater (250) updates the node in the first DOM for which a difference has been found in the second DOM.

Figure 3B:
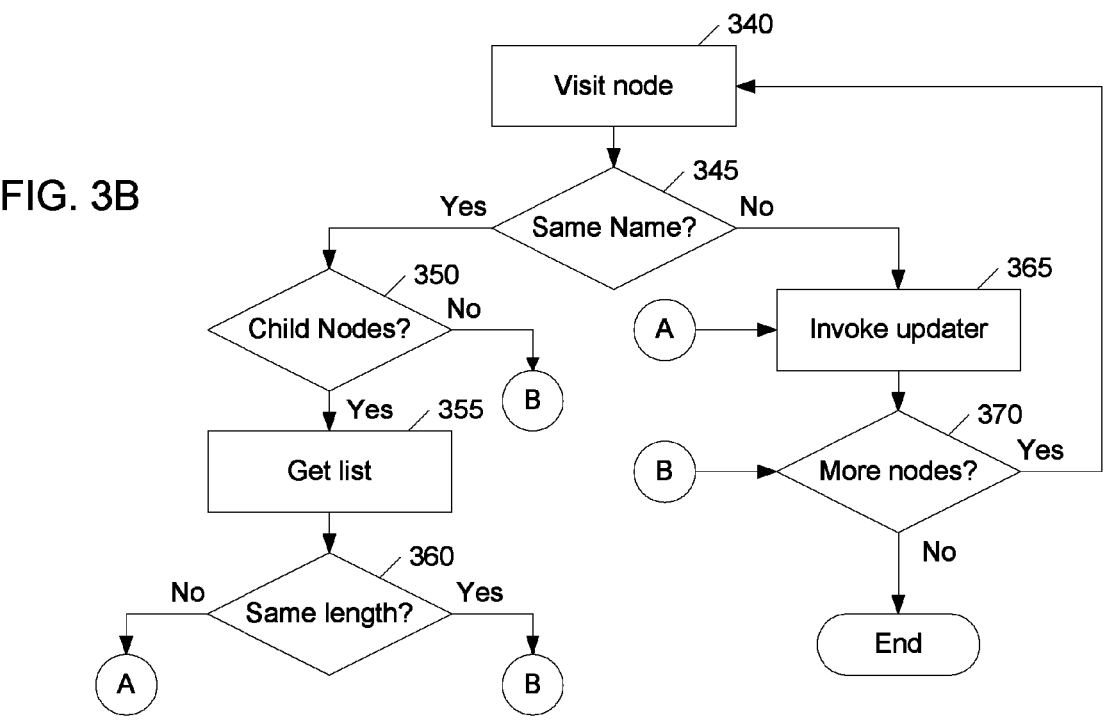
FIG. 3B is a flow chart showing the operational steps involved in a second process according to the preferred embodiment.

With reference to FIG. 3B, the comparator (245) visits (step 340) the first root node (500) and the second root element node (700). The comparator (245) queries the first root node (500) and the second root element node (700) in order to obtain associated names. With reference to FIG. 3B, in response to obtaining the names, the comparator (245) compares (step 345) the names to determine whether the names match.

If the comparator (245) determines that the names do not match, the comparator (245) invokes (step 365) the updater (250) as will be described later.

In the example herein, the comparator (245) determines that the names (namely, "<html>") match.

In response to the names matching, the comparator (245) queries the first root node (500) and the second root element node (700) in order to determine (step 350) whether each of the first root node (500) and the second root element node (700) has a child node.

If the comparator (245) determines that neither the first root element node (500) nor the second root element node (700) has a child node, the comparator (245) makes a determination (step 390) as to whether there are any further nodes to visit. It should be understood that if either the first root element node (500) nor the second root element node (700) the comparator (245) determines (step 370) that there are no further nodes to visit, the process ends.

If the comparator (245) determines that one or more of the first root element node (500) and the second root element node (700) has a child node, the comparator (245) executes a further query.

In the example herein, with reference to FIGS. 5 and 7, the comparator (245) determines that each of the first root element node (500) and the second root element node (700) has a child node (namely, nodes 505, 510 and 705, 710 respectively). In response, the comparator (245) queries each of the first root element node (500) and the second root element node (700) to obtain (step 355) an object representing a list of child nodes.

In response to obtaining each list, a comparison is executed wherein the comparator (245) uses a "length" property of each list, to return a number of nodes in the list. It should be understood that if one of the first root element node (500) and the second root element node (700) does not have children, an associated value of the length property is "0".

For each of the first root element node (500) and the second root element node (700), a length of the list is shown below:
Length (Node 500)="2"
Length (Node 700)="2"

The comparator (245) compares (step 360) the lengths to determine whether they match.

If the lengths do not match, this indicates a difference. For example, if the first root element node (500) has two children and the second root element node (700) has three children, a difference has been found.

If the lengths do not match, the comparator (245) is operable to invoke (step 365) the updater (250) as will be described later.

In the example herein, the comparator (245) determines that the lengths (i.e. "2") match and in response, the comparator (245) makes a determination (step 370) as to whether there are any further nodes to visit.

In the example herein, the comparator (245) determines that there are further nodes to visit and the comparator (245) visits (step 340) a next node in a left subtree of each DOM. In the example herein, a next node is the first element node (505) and the ninth element node (705). The comparator (245) executes the process of FIG. 3B for the first element node (505) and the ninth element node (705).

The comparator (245) visits (step 340) the first element node (505) and the ninth element node (705). The comparator (245) queries the first element node (505) and the ninth element node (705) in order to obtain associated names. The comparator (245) compares (step 345) the names to determine whether the names match.

In the example herein, the comparator (245) determines that the names (namely, "<head>") match. In response, the comparator (245) determines (step 350) whether each of the first element node (505) and the ninth element node (705) has a child node.

In the example herein, with reference to FIGS. 5 and 7, the comparator (245) determines that each of the first element node (505) and the ninth element node (705) has a child node (namely, nodes 515, 525 and 715, 725 respectively).

In response, the comparator (245) queries each of the first element node (505) and the ninth element node (705), to obtain (step 355) a list of child nodes.

In response to obtaining each list, the comparator (245) uses a "length" property as described above. For each of the first element node (505) and the ninth element node (705), a length of the list is shown below:
Length (Node 505)="2"
Length (Node 705)="2"

The comparator (245) compares (step 360) the lengths to determine whether they match.

In the example herein, the comparator (245) determines that the lengths (i.e. "2") match.

In response, the comparator (245) makes a determination (step 370) as to whether there are any further nodes to visit.

In the example herein, the comparator (245) determines that there are further nodes to visit and the comparator (245) visits (step 340) a next node in each left subtree associated with each DOM.

In the example herein, a next node is the third element node (515) and the tenth element node (715). The comparator (245) executes the process of FIG. 3B for the third element node (515) and the tenth element node (715).

The comparison process for further nodes in each left subtree of each DOM will not be described further, as in the present example, the comparator (245) determines that the left subtree of the second DOM is not different from the left subtree of the first DOM.

Comparison of nodes of the right subtree will now be described

The comparator (245) compares fourth and twelfth element nodes (510 and 710 respectively); fifth and thirteenth element nodes (540 and 740 respectively), sixth and fourteenth element nodes (545 and 745 respectively) and third and seventh attribute nodes (550 and 750 respectively). In the example described herein, the comparator (245) does not determine any differences between corresponding nodes.

Comparison of the second and fifth text nodes (555 and 755 respectively) will now be described.

The comparator (245) visits (step 340) the second text node (555) and the fifth text node (755). The comparator (245) queries the second text node (555) and the fifth text nodes (755) in order to obtain associated names. The comparator (245) compares (step 345) the names to determine whether the names match.

In the example described herein, with reference to FIGS. 5 and 7, the comparator (245) determines that the names (namely, "Company X is due to be sold" and "Company X has been sold to Company Y") do not match. This indicates that a difference has been found.

In response, the comparator (245) is operable to invoke (step 365) the updater (250).

With reference to FIG. 3A, the updater (250) is operable to update (step 330) the first DOM with at least one node of the second DOM that is different from a corresponding at least one node of the first DOM. The updater (250) will now be described in more detail.

The updater (250) queries the node (i.e. the fifth text node 755) of the second DOM that is different from a corresponding node (i.e. the third text node 555) of the first DOM to determine an associated parent node. In the example herein, the parent node is the fourteenth element node (745).

In response to determining the parent node, the updater executes a method (e.g. the method "removeChild") to remove the fifth text node (755) from a list of child nodes associated with the parent node (745).

With reference to FIG. 3A, the updater (250) is operable to update (step 330) the first DOM with at least one node of the second DOM that is different from a corresponding node of the first DOM. The updater (250) will now be described in more detail.

The updater (250) queries the node (i.e. the fifth text node 755) of the second DOM that is different from a corresponding node (i.e. the third text node 555) of the first DOM to determine an associated parent node. In the example herein, the parent node is the fourteenth element node (745).

In response to determining the parent node, the updater executes a method (e.g. the method "removeChild") to remove the fifth text node (755) from a list of child nodes associated with the parent node (745).

In response to removing the fifth text node (755) from the list of child nodes associated with the parent node (745), the updater (250) uses a method (e.g. the method adoptNode) to adopt the fifth text node (755) from the second XHTML document to the first XHTML document.

In response to adopting the fifth text node (755), the updater (250) uses a method (e.g. the method replaceChild) to replace the second text node (555) with the fifth text node (755).

The renderer (240) renders (step 335) the first XHTML document. A representation of the second web page (800) is shown in FIG. 8 comprising a first section (805) and a second section (810).

With reference to FIGS. 3B, the comparator (245) makes a determination (step 370) as to whether there are any more nodes to visit.

In the example herein, the comparator (245) determines that there are further nodes to visit and with reference to FIGS. 5 and 7, the comparator (245) uses the process of FIG. 3B to compare seventh and fifteenth element nodes (560 and 760 respectively); eighth and sixteenth element nodes (565 and 765 respectively); fourth and eighth attribute nodes (570 and 770 respectively) and third and sixth text nodes (575 and 775 respectively). In the example described herein, the comparator (245) does not determine any differences between corresponding nodes. In response, the process ends as there are no more nodes to visit.

Figure 8:
FIG. 8 is a representation of a second web page

It can be seen in FIG. 8 that the second web page containing a different first section (805) from the first section (605) of the first web page has been rendered without requiring an update to the unchanged second section (610).

The preferred embodiment of the present invention provides a mechanism which improves handling of regular updates to a web page. As described above, regular updates to a web page can be frustrating to a user. Furthermore, a full web page refresh can be very slow and cause the screen to flicker.

Advantageously, the preferred embodiment of the present invention allows for update of only a changed portion of a web page. Thus, a user can continue to interact with unchanged portions of the web page. Furthermore, the mechanism of the present invention provides for fast updating of the web page.

Furthermore, the apparatus of the preferred embodiment of the present invention is provided at the client side.

Furthermore, advantageously, since the apparatus of the present invention is provided at the client side, no change is required at the server side. This is advantageous because server side change can be complex and can affect multiple clients if errors occur. Furthermore, the extra work that would be required by the server side can result in delay at the client side. Furthermore, in order to compare web pages for differences, a server computer is required to store an older version(s) of the web page which can result in a huge storage overhead at the server computer.

Alternative implementations of aspects of the preferred embodiment will now be discussed.

It should be understood that the render step 335 can be executed following comparison of the remainder of the DOMs.

It should be understood that the comparator (245) can be configurable to compare DOMs starting from any node in the DOMs. For example, the comparator (245) is configurable to compare a plurality of branches of each DOM (e.g. the first branch, the second branch, the third branch and the fourth branch). This is advantageous, in that it may have been determined (for example in accordance with historical statistics; in accordance with an instruction from a web page developer etc.) that element nodes having the names "<html>", "<head>" and "<body" do not change. Thus, the comparison process is more efficient by removing the need for the comparator (245) to visit and compare these nodes.

It should be understood that the comparator (245) can check for any number of differences between nodes (e.g. differences in values associated with attributes).

It should be understood that the updater (250) can update a DOM in a number of ways. In the example described herein, update occurs at the node in the first DOM for which a difference has been found in the second DOM. Alternatively, update can occur at the node in the first DOM for which a difference has been found in the second DOM and to update one or more associated children.

In an example, the updater (250) is configurable to update a node in the first DOM for which a difference has been found in the second DOM and to update all of its associated children.

In this example, the determination (step 375) as to whether each of the first root node (500) and the second root element node (700) has a child node is an efficient way for the comparator (245) to determine whether there are any differences between the DOMs at a particular level without having to visit and compare nodes at a lower level. That is, if the first root element node (500) has a child node and the second root element node (700) does not have a child node, a difference has been found at the first level of the DOM. Thus, visitation and comparison of nodes at one or more lower levels below the first level need not occur. Rather, the comparator (245) invokes the updater (250) to update the first DOM at the first level, wherein the first root node (500) and all of its associated children (nodes 505 to 575) are updated (e.g. by replacement with the second root node (700) and all of its associated children (nodes 705 to 775).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A client apparatus programmed for processing an electronic document for display to a user, said electronic document comprising a number of nodes logically arranged in a tree structure with a number of levels in which each node in a lower level has a relationship to a node in a higher level, the apparatus comprising:
   a receiver for receiving first data via a network, said first data comprising a first version of said electronic document, and for subsequently receiving a refresh of the first data, said refresh of the first data comprising second data comprising a second version of said electronic document;
   a comparator for determining whether there is a difference between the first data and the second data by comparing corresponding nodes from said first and second versions of said electronic document; and
   an updater, responsive to the comparator determining that there is a difference, for updating the first data with the second data,
   in which, upon finding a node that differs between said first and second versions of said electronic document, the comparator does not compare nodes at any lower level that are related to the node that differs between said first and second versions of said electronic document.

2. A client apparatus according to claim 1, further comprising a renderer for rendering at least one of the first data and the second data.

3. A client apparatus according to claim 2, further comprising:
   a storage device; and
   a parser for storing the first data and the second data in said storage device and parsing the first data and the second data to obtain a first logical structure and a second logical structure respectively.

4. A client apparatus according to claim 3, wherein the comparator accesses the first logical structure and the second logical structure in order to compare the first data and the second data.

5. A client apparatus according to claim 4, wherein the comparator compares at least one attribute of the first logical structure and the second logical structure.

6. A client apparatus according to claim 5, wherein said at least one attribute comprises at least one of a name, a child node, and a number of child nodes.

7. A method for updating first data comprising a first version of an electronic document defined by a series of nodes logically arranged in a tree structure with a number of levels in which each node in a lower level has a relationship to a node in a higher level and for invoking a refresh of the first data, wherein, in response to the refresh invocation, second data is received and comprises a second version of said electronic document, the method comprising:
   comparing the first data and the second data by comparing corresponding nodes from said first and second versions of said electronic document;
   determining whether there is a difference between the first data and the second data; and
   updating, in response to determining that there is a difference, nodes from the first data with corresponding nodes from the second data,
   in which updating nodes from the first data with corresponding nodes from the second data comprises replacing a node that differs and any related nodes at any lower level in said first version with the corresponding node from said second data version and any related nodes at any lower level of the second version, in which, upon finding a node that differs between said first and second versions of said electronic document, the comparator does not compare nodes at any lower level that are related to the node that differs between said first and second versions of said electronic document.

8. A method according to claim 7, further comprising rendering at least one of the first data and the second data.

9. A method according to claim 8, further comprising:
   storing the first data and the second data in a storage device; and
   parsing the first data and the second data to obtain a first logical structure and a second logical structure, respectively.

10. A method according to claim 9, wherein comparing the first data and the second data further comprises accessing the first logical structure and the second logical structure.

11. A method according to claim 10, wherein comparing the first data and the second data further comprises comparing at least one attribute of the first logical structure and the second logical structure.

12. A method as claimed in claim 11, wherein said at least one attribute comprises at least one of: a name, a child node, and a number of child nodes.

13. A method as claimed in claim 12, wherein the first logical structure and the second logical structure are trees and wherein accessing the first logical structure and the second logical structure further comprises executing a tree walking algorithm.

14. A computer program product for updating data in a client computer system for receiving first data comprising a first version of an electronic document defined by a series of nodes logically arranged in a tree structure with a number of levels in which each node in a lower level has a relationship to a node in a higher level and for invoking a refresh of the first data, wherein, in response to the refresh invocation, the client computer system is operable to receive second data comprising a second version of said electronic document, said computer program product comprising a physical computer usable medium having computer usable program code embodied therewith, said computer usable program code comprising:

- computer usable program code that compares the first data and the second data by comparing corresponding nodes from said first and second versions of said electronic document;
- computer usable program code that determines whether there is a difference between the first data and the second data; and
- computer usable program code that, in response to a determination that there is a difference, updates nodes from the first data with corresponding nodes from the second data,
- in which the computer usable program code that determines whether there is a difference between the first data and the second data comprises computer usable program code that utilizes a tree walking algorithm based on said tree structure of said nodes of the electronic document to compare corresponding nodes from said first and second versions of said electronic document, in which, upon finding a node that differs between said first and second versions of said electronic document, the comparator does not compare nodes at any lower level that are related to the node that differs between said first and second versions of said electronic document.

15. A computer program product according to claim 14 further comprising computer usable program code configured to render at least one of the first data and the second data.

16. A computer program product according to claim 15 further comprising further comprising:
- computer usable program code configured to store the first data and the second data in a storage device; and
- computer usable program code configured to parse the first data and the second data to obtain a first logical structure and a second logical structure respectively.

17. A computer program product according to claim 16 wherein the computer usable program code configured to compare the first data and the second data further comprises computer usable program code configured to access the first logical structure and the second logical structure.

18. A computer program product according to claim 17 wherein the computer usable program code configured to compare the first data and the second data further comprises computer usable program code configured to compare at least one attribute of the first logical structure and the second logical structure.

19. A computer program product according to claim 18 wherein the at least one attribute comprises at least one of a name, a child node, and a number of child nodes.

20. A computer program product according to claim 19 wherein the computer usable program code configured to compare the first and the second data further comprises computer usable program code configured to execute a tree walking algorithm.

21. A client apparatus according to claim 1, in which each said node has a type, types of said nodes comprising: element nodes, text nodes and attribute nodes.

22. A client apparatus according to claim 1, wherein said comparator is programmed to use a tree waking algorithm based on said tree structure of said nodes of said electronic document to compare said corresponding nodes from said first and second versions of said electronic document.

23. A client apparatus according to claim 1, in which the updater replaces the node that differs and any related nodes at any lower level in said first version with the node from said second version and any related nodes at any lower level of the second version.

* * * * *